United States Patent [19]

Pipper et al.

[11] Patent Number: 4,994,550
[45] Date of Patent: Feb. 19, 1991

[54] PROCESS FOR THE CONTINUOUS PREPARATION OF NYLON 4,6 FROM AQUEOUS SALT SOLUTION

[75] Inventors: Gunter Pipper, Bad Duerkheim; Eckhard M. Koch, Fussgoenheim, both of Fed. Rep. of Germany

[73] Assignee: BASF Aktiengesellschaft, Ludwigshafen, Fed. Rep. of Germany

[21] Appl. No.: 494,402

[22] Filed: Mar. 16, 1990

[30] Foreign Application Priority Data

Apr. 19, 1989 [DE] Fed. Rep. of Germany ....... 3912770

[51] Int. Cl.$^5$ ............................................. C08G 69/28
[52] U.S. Cl. .................................... 528/335; 524/606; 526/65; 526/68; 526/71
[58] Field of Search .................... 528/335; 526/65, 68, 526/71

[56] References Cited

U.S. PATENT DOCUMENTS 4,719,284 1/1988 Nielinger et al. .................... 528/335

FOREIGN PATENT DOCUMENTS 0160337 4/1985 European Pat. Off. .

*Primary Examiner*—Harold D. Anderson
*Attorney, Agent, or Firm*—Keil & Weinkauf

[57] ABSTRACT

A process for the continuous preparation of polytetramethylene adipamide, in which (a) an aqueous solution of the salt of 1,4-diaminobutane and adipic acid is heated with evaporation of water to form a vapor phase and a molten prepolymer, (b) the said prepolymer and vapor phase are passed, to effect thorough mixing thereof, through a mass transfer zone equipped with baffles and located immediately downstream of stage (a), (c) the said vapor phase is separated from the polymer in a separting zone and the polymer is discharged in the form of a melt capable of being granulated, with the proviso that the total residence time in stages (a), (b) and (c) is less than 5 minutes, and (d) pyrrolidine is distilled off from the vapor phase separated in stage (c) and 1,4-diaminobutane is recycled to the vaporizing stage (a).

10 Claims, No Drawings

PROCESS FOR THE CONTINUOUS PREPARATION OF NYLON 4,6 FROM AQUEOUS SALT SOLUTION

EP-A 210,511 discloses a process in which an aqueous solution of a salt of 1,4-diaminobutane and adipic acid is condensed in a tubular reaction zone over a period of up to 30 minutes at a temperature of from 280° to 320° C. and under superatmospheric pressure to give, after pressure release, a solid prepolymer. In addition, EP-A 160,337 discloses a process in which a salt of 1,4-diaminobutane and adipic acid is precondensed at a temperature of 210° C. and under superatmospheric pressure over a period of 55 minutes and the resulting prepolymer is passed, in the molten state, through a tube over a period of about 15 minutes and at a temperature of more than 280° C. These processes suffer from the drawback that condensation in the melt readily causes discoloration of the product and there is loss of eliminated 1,4-diaminobutane.

It is therefore an object of the invention to provide a process for the preparation of tetramethylene adipamide which avoids damage to the polymer in the melt and reduces loss of 1,4-diaminobutane and formation of pyrrolidine.

This object is achieved by a continuous process for the preparation of polytetramethylene adipamide in which an aqueous solution of a salt of 1,4-diaminobutane and adipic acid is heated to a temperature of from 270° to 330° C. under a pressure of from 1 to 10 bar to form prepolymer and a vapor phase, which are separated from each other, wherein (a) the aqueous solution of 1,4-diaminobutane and adipic acid is heated in a vaporizing zone to a temperature of from 270° to 330° C. for a period of not more than 120 seconds under a pressure of from 1 to 10 bar with evaporation of water to form a vapor phase and molten prepolymer, (b) the said prepolymer and vapor phase are then passed, to effect thorough mixing thereof, through a mass transfer zone equipped with baffles and located immediately downstream of said vaporizing zone, for a residence time of from 70 to 120 seconds at a temperature of from 270° to 330° C. and under a pressure of from 1 to 10 bar, to give molten prepolymer and a vapor phase, (c) the said vapor phase is separated from the polymer in a separating zone and the polymer is discharged in the form of a melt capable of being granulated, with the proviso that the total residence time in stages (a), (b) and (c) is less than 5 minutes, and (d) pyrrolidine is distilled off from the vapor phase separated in stage (c) and 1,4-diaminobutane is recycled to the vaporizing stage (a).

Our novel process has the advantage of substantially reducing damage to the polymer, of substantially reducing the formation of pyrrolidine and of allowing for complete recovery of 1,4-diaminobutane and recycling thereof to the process.

According to the invention the starting material is an aqueous solution of a salt of 1,4-diaminobutane and adipic acid. The solution used normally has a pH of from 7.8 to 7.9 at 20° C. It is advantageous to start from a 40% to 65% w/w solution of the salt having a temperature of from 80° to 100° C.

According to the invention, in stage (a) the aqueous salt solution is continuously fed to a vaporizing zone. Here the aqueous salt solution is heated to a temperature of from 270° to 330° C. under a pressure of from 1 to 10 bar with evaporation of water to form a prepolymer. It is advantageous to apply a pressure of from 7 to 9 bar and to heat the solution to from 300° to 310° C. The residence time must not exceed 120 seconds and is preferably from 70 to 100 seconds. There is obtained a mixture of vapor and molten prepolymer. The degree of conversion of the prepolymer is advantageously >93% and is preferably from 94% to 96%.

Advantageously, the vaporizing zone is tubular and is preferably a bundle of tubes. Tubes or bundles of tubes having a cross-section which repeatedly varies from circular to slot-shaped along the axis have proved to be particularly advantageous. Another advantageous embodiment of the vaporizing zone comprises tubes or bundles of tubes in which the individual tubes are equipped with baffles in order to provide a large surface area. This is achieved, for example, by filling the tubes with packing elements such as Raschig rings, metal rings or, in particular, wire-netting elements.

The prepolymer and vapor phase, which substantially consists of steam and small amounts of 1,4-diaminobutane and pyrrolidine, is passed through a mass transfer zone (b) immediately downstream of the zone of stage (a) and equipped with baffles, to effect thorough mixing of the mixture during a residence time of from 70 to 120 seconds at a temperature of from 270° to 330° C. and under a pressure of from 1 to 10 bar to give molten polymer and a vapor phase.

Advantageously, the mass transfer zone has the same conditions of pressure and temperature as stage (a). The residence time in the mass transfer zone is advantageously from 70 to 100 s. Advantageously, the mass transfer zone is, like the vaporizing zone, a bundle of tubes. The baffle elements used, for example packing elements such as Raschig rings, metal rings or, in particular, wire netting elements, provide a large surface area of from, say, 0.5 to 2 $m^2/l$. This causes the phases, i.e. the prepolymer and the vapor, to be brought into intimate contact with each other, which greatly reduces the amount of diamine which is entrained by the steam.

The two-phase mixture leaving the mass transfer zone (b) and consisting of vapor and polymer is separated in a separating zone (c). Separation normally takes place automatically on account of physical differences, the polymer collecting at the bottom of the separating zone, where it is discharged in a form capable of being granulated. The liberated vapors are also removed from the zone and essentially comprise steam and small amounts of diamine and pyrrolidine.

The residence time of the molten polymer in stage (c) is advantageously less than 60 seconds and is preferably from 35 to 45 seconds. An important feature of the invention is that the total residence time of the polymer in the molten state in stages (a), (b) and (c) must be less than 5 minutes, for example is from 2.5 to 4 minutes. The resulting polymer generally has a content of terminal amino groups of from 250 to 400, and in particular from 150 to 350, mole equivalents per kg and a relative viscosity of from 1.50 to 1.55.

The vapor phase leaving stage (c) is distilled in stage (d), pyrrolidine being separated and 1,4-diaminobutane being recycled to stage (a). Advantageously, distillation is carried out in a column having from 5 to 15 theoretical trays, under superatmospheric pressure, for example the pressure under which the vapors are separated in stage (c). Pyrrolidine is removed at the top of the column, whilst the bottoms consist of an aqueous solution of 1,4-diaminobutane.

Advantageously, water is fed to the top of the column to increase separating efficiency, the feed rate being, for example, from 0.15 to 0.4 kg of water per kg of vapor. It is also advantageous to replenish the recycled 1,4-diaminobutane with an amount of fresh 1,4-diaminobutane which corresponds to the amount of pyrrolidine removed plus an amount of 1,4-diaminobutane sufficient to guarantee a content of terminal amino groups in the discharged polymer of from 150 to 400, advantageously from 250 to 300, mole equivalents per kg.

Advantageously, the polymer is further condensed in the solid phase until the desired viscosity is obtained, for example after a residence time of from 10 to 40 hours at a temperature of from 220° to 270° C., using inert gases such as nitrogen, steam or superheated steam, as heat transfer medium, preferably in the form of a counter-current. In order to achieve a high space-time yield and a high molecular weight, it is advantageous to use, as starting material for the solid-phase condensation, a polymer having a content of terminal amino groups of from 150 to 400, and in particular from 250 to 300, mole equivalents per kg and a relative viscosity of from 1.50 to 1.55°. The final product is then extruded together with the usual additives such as glass fibers, mineral fillers, stabilizers, lubricants and fire retarding agents. It is advantageous to feed the additives to the molten polymer discharged from stage (c) and then to continue condensation in the solid phase to the desired viscosity.

The process of the invention produces a polytetramethylene adipamide which is suitable for the manufacture of shaped articles by injection molding or extrusion and for the manufacture of filaments and fibers.

The process of the invention is illustrated by the following Example.

EXAMPLE

A 60% w/w solution of a salt of equimolar amounts of 1,4-diaminobutane and adipic acid and having a pH of 7.8 is prepared at 94° C. and metered to the top of a vertical vaporizing tube 3 meters long at a rate corresponding to a polyamide yield of 5 kg/h. The vaporizer has an internal volume of 180 ml and has alternating cylindrical and slot-shaped sections at intervals along its axis. The surface area available for heat exchange is about 1,400 cm$^2$. The tube is heated by a fast-flowing liquid heat-transfer medium.

The residence time in the vaporizer is about 100 seconds at a temperature of 308° C. and a pressure of 8.0 bar. The mixture of molten prepolymer and vapor leaving the vaporizer has a temperature of 305° C. and passes immediately into a mass-transfer zone packed with packing elements and having a contact surface area of 1 m$^2$/l. The temperature and pressure conditions in the mass-transfer zone are the same as in the vaporizer.

In this zone there is intimate mass transfer between the amine-containing vapor phase and condensed prepolymer. The residence time in this zone is about 95 seconds. The mixture discharged therefrom comprises molten polymer and vapor, which is separated, in a separator, into vapor and polymer phases. The polymer phase is discharged immediately, after a residence time as melt in the separator of approximately 45 seconds. The total residence time of the melt in the vaporizing zone, mass-transfer zone and separator is about 4 minutes.

The polymer has a relative viscosity of 1.55, a content of terminal amino groups of 290 mole equivalents per kg and a content of terminal carboxyl groups of 122 mole equivalents per kg. The content of terminal pyrrolidine groups is 0.1 mmole per gram of polymer. The color of the resulting polymer is white.

The vapors separated consist of steam, 0.9% w/w of pyrrolidine and about 8.0% w/w of 1,4-diaminobutane and are fed to a column having 10 theoretical trays at a temperature of 303° C. and under a pressure of 8 bar. About 900 ml/h of water are fed to the top of the column to improve separating efficiency. The head of the column is kept at a temperature of 175° C. The condensed vapors contain 0.85% w/w of pyrrolidine and <0.05% w/w of 1,4-diaminobutane. The bottoms consist of an aqueous solution of 1,4-diaminobutane, which is replenished with 170 g/h of a 50% w/w aqueous solution of 1,4-diaminobutane and then recycled to the vaporizer.

Post-condensation

The granulated polymer thus obtained is condensed in the solid phase under a counter-current of superheated steam at a temperature of 250° C. and for a period of 27 hours, the ratio of polymer to steam being 2:1 by weight. There is obtained a white polymer having a relative viscosity of 4.0, a content of terminal amino groups of 39 to 41 mole equivalents per kg and a content of terminal carboxyl groups of 8 mole equivalents per kg.

We claim:
1. A process for the continuous preparation of polytetramethylene adipamide, wherein
   (a) an aqueous solution of the salt of 1,4-diaminobutane and adipic acid is heated in a vaporizing zone to a temperature of from 270° to 330° C. for a period of not more than 120 seconds under a pressure of from 1 to 10 bar with evaporation of water to form a vapor phase and molten prepolymer,
   (b) the said prepolymer and vapor phase are then passed, to effect thorough mixing thereof, through a mass transfer zone equipped with baffles and located immediately downstream of said vaporizing zone, for a residence time of from 70 to 120 seconds at a temperature of from 270° to 330° C. and under a pressure of from 1 to 10 bar, to give molten prepolymer and a vapor phase,
   (c) the said vapor phase is separated from the polymer in a separating zone and the polymer is discharged in the form of a melt capable of being granulated, with the proviso that the total residence time in stages (a), (b) and (c) is less than 5 minutes, and
   (d) pyrrolidine is distilled off from the vapor phase separated in stage (c) and 1,4-diaminobutane is recycled to the vaporizing stage (a).

2. A process as claimed in claim 1 wherein the degree of conversion maintained in stage (a) is more than 93%.

3. A process as claimed in claim 1, wherein the temperature in stage (a) is maintained at from 300° to 310° C. whilst the pressure is adjusted to from 7 to 9 bar.

4. A process as claimed in claim 1 wherein the residence time in stage (a) is from 70 to 100 seconds.

5. A process as claimed in claim 1, wherein the residence time in stage (b) is from 70 to 100 seconds.

6. A process as claimed in claim 1, wherein the temperature in stage (b) is maintained at from 300° to 310° C. whilst the pressure is adjusted to from 7 to 9 bar.

7. A process as claimed in claim 1, wherein the residence time in stage (c) is less than 60 seconds.

8. A process as claimed in claim 1, wherein the melt discharged from stage (c) has a content of terminal amino groups of from 150 to 400 mole equivalents per kg.

9. A process as claimed in claim 1, wherein the polymer discharged from stage (c) is further condensed in the solid phase with superheated steam at a temperature of from 220° to 270° C. to give highly polymerized polytetramethylene adipamide.

10. A process as claimed in claim 1, wherein additives are added to the polymer discharged from stage (c).

* * * * *